United States Patent

[11] 3,588,690

[72] Inventor Hugh Allen Griffin
 Fortville, Ind.
[21] Appl. No. 842,197
[22] Filed July 16, 1969
[45] Patented June 28, 1971
[73] Assignee The United States of America as represented by the Secretary of the Navy

[54] TEST CIRCUIT INCLUDING BRIDGE TYPE OSCILLATOR MEANS FOR MONITORING EQUIVALENT SERIES RESISTANCE OF QUARTZ CRYSTALS
3 Claims, 1 Drawing Fig.

[52] U.S. Cl. .................................................. 324/56,
 324/62R, 324/62B, 331/64, 331/139
[51] Int. Cl. .................................................. G01r 29/22
[50] Field of Search .................................................. 324/51, 62,
 56; 331/110, 64, 139

[56] References Cited
UNITED STATES PATENTS
2,476,954 7/1949 Blackburn .................... 324/56
2,611,873 9/1952 Gager et al. .................... 331/139
2,871,356 1/1959 Sulzer .................... 331/139X
2,919,398 12/1959 Guttwein et al. .................... 324/56
3,127,577 3/1964 Lapointe .................... (331/110UX)
3,284,707 11/1966 Clinton .................... 324/62
3,319,184 5/1967 McCall .................... 331/110X Primary Examiner—Gerard R. Strecker
Attorneys—Edgar J. Brower and H. H. Losche ABSTRACT: A circuit for testing the series equivalent resistance of quartz crystals having a quartz crystal for test in a bridge circuit coupled to a differential amplifier with the output thereof fed back to the bridge circuit producing an oscillator that will oscillate when the equivalent resistance of the crystal is less than a predetermined resistance in the bridge circuit and stop oscillation when the crystal equivalent resistance equals or exceeds the predetermined resistance, the output of the differential amplifier being operative to drive an indicator of the oscillator condition and thus indicate the resistance value above or below the predetermined resistance value.

PATENTED JUN28 '71  3,588,690
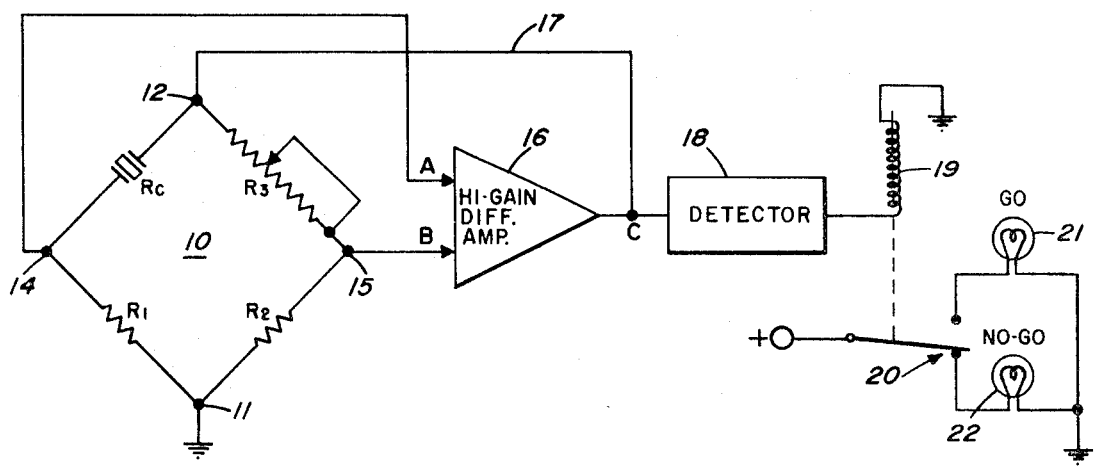
INVENTOR
HUGH ALLEN GRIFFIN
BY *H. H. Loscke*
ATTORNEY

3,588,690

TEST CIRCUIT INCLUDING BRIDGE TYPE OSCILLATOR MEANS FOR MONITORING EQUIVALENT SERIES RESISTANCE OF QUARTZ CRYSTALS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to crystal impedance meter devices and more particularly to a circuit for continuously monitoring the test of the series equivalent resistance of a quartz crystal through a wide temperature range by comparison of the crystal equivalent resistance with a predetermined resistance in a bridge controlled oscillator circuit constructed and arranged to oscillate whenever the crystal equivalent resistance is of a lesser value than the predetermined resistance.

In the known prior art, crystal impedance meters are used to evaluate the crystal equivalent resistance value by using an adjustable signal generator in series with a series resistor and a crystal. The frequency is adjusted to obtain a peak voltage on the meter. The crystal is then replaced by a variable resistance which is adjusted to provide the same voltage. This resistance is equal to the crystal series resistance. The disadvantages of these known devices are that the signal generator must be returned to obtain a peak voltage across the crystal each time a different crystal is installed. Also, if a crystal is tested over a temperature range and the crystal resonant frequency varies, the signal generator must be constantly readjusted. It has been found that quartz crystals will have quick changes in the series resistance, sometimes in the middle of the temperature range, and these quick changes could not be adjusted for in the known test equipment.

SUMMARY OF THE INVENTION

In this invention a resistance bridge circuit is used in the input to a differential amplifier, the output of which is fed back to the bridge circuit to produce an oscillator. A crystal to be tested is placed in the bridge circuit and its equivalent resistance compared with the calibrated resistance os a variable resistance in the circuit. Whenever the equivalent series resistance of the crystal is less than the resistance set by the variable resistance, the oscillator will oscillate since this produces an in-phase voltage relation between one input and the output of the differential amplifier through the crystal to the amplifier and this inphase voltage is predominant over the voltage in the out-of-phase channel through the variable resistance. Whenever the equivalent series resistance of the crystal is equal to or greater than the resistance set by the variable resistance, the oscillator will not oscillate since this produces an out-of-phase voltage condition between the other input and the output of the differential amplifier through the variable resistance to the amplifier and this out-of-phase voltage is predominant over the inphase input voltage through the crystal to the amplifier. The output of the differential amplifier is detected and the detected output used to control an indicator to show whether the equivalent resistance of the crystal is in a GO condition in which the equivalent resistance of the crystal is less than the setting of a reference resistance or in a NO-GO condition in which the equivalent resistance of the crystal is equal to or greater than the reference resistance. Where the tested quartz crystal has a quick resistance change in a temperature range of test, this will be monitored in the indicator to indicate a NO-GO condition at this particular temperature. The indicator may be of the type to change from NO-GO back to GO condition where the crystal series resistance returns to normal, or the indicator may be of the type to remain in the NO-GO indicated condition once it is tripped there by an improper series resistance. It is therefore a general object of this invention to provide a circuit to test the equivalent resistance of quartz crystals throughout a wide temperature range by making a comparison with a predetermined reference resistance which is correlated by the phasing of applied input and output oscillations of a differential amplifier in a circuit with the crystal and reference resistance.

BRIEF DESCRIPTION OF THE DRAWING

These and other objects and the attendant advantages, features, and uses will become more apparent to those skilled in the art as the description proceeds when considered along with the accompanying figure of drawing illustrating a preferred embodiment of the invention partially in a circuit schematic and partially in block schematic.

DESCRIPTION OF THE PREFERRED EMBODIMENT

Referring more particularly to the figure of drawing, a resistance bridge circuit 10 has two fixed resistors R1 and R2 with a common coupling connected to a fixed potential, such as ground 11, and the opposite leads coupled to terminals 14 and 15, respectively. In the third leg of the bridge circuit 10 is a calibrated variable or adjustable resistor R3 connected between the terminal 15 and an input terminal 12. In the fourth leg of the bridge circuit 10 is placed a crystal to be tested, such as the crystal Rc shown herein coupled between the terminal 14 and the input terminal 12. The resistance bridge circuit 10 operates as a frequency determination network in this circuit with a high gain differential amplifier 16 to produce an oscillator circuit. Terminal 14 of the bridge circuit 10 is coupled to an input A of the high gain differential amplifier 16, and terminal 15 of the resistance bridge circuit 10 is coupled to an input B of the high gain differential amplifier 16. The output terminal C of the high gain differential amplifier 16 is fed back by way of conductor 17 to the input terminal 12 of the frequency determination network 10. The network 10 and amplifier 16 together provide an oscillator circuit which will oscillate whenever the inputs are in proper phase with the output of the amplifier. In the oscillator circuit herein, whenever Rc is of less resistance value than R3, the input A to the high gain differential amplifier 16, which is in phase with the output C of the amplifier 16, will predominate in voltage amplitude over the out-of-phase input voltage B to cause the circuit to oscillate at a frequency established by the frequency discrimination network 10. Whenever the equivalent resistance Rc of the crystal if equal to or greater than the resistance R3, the output of the network 10 applied as an input to terminal B of the differential amplifier 16, which is out-of-phase with the output C of this amplifier, will predominate in voltage amplitude over in-phase input voltage A to stop or block oscillations of the oscillator circuit 10,16.

The output C of the high gain differential amplifier is coupled also through a detector circuit 18 to detect or rectify the oscillations of the amplifier 16, and these detected signals will be applied through a relay coil 19 to actuate a single-pole double-throw relay switch 20. The upper contact of the switch 20 is coupled through a glow tube or other type of indicator means 21 while the lower contact is coupled through a glow tube or other indicator means 22 to ground. The switch blade of the switch 20 is coupled to a source of voltage supply to make one of the indicator lamps 21 or 22 to glow. Indicator lamp 21 has the legend GO while the indicator lamp 22 has the legend NO-GO thereon for the purpose later to become clear. When the oscillator circuit 10,16 is an an oscillation state, the detector 18 will produce output voltages through the relay coil 19 to pull the switch blade of switch 20 to the upper contact making the upper indicator glow lamp 21 active to show a GO condition, while in the nonoscillating state the NO-GO lamp will be indicating a NO-GO condition. While the relay switch 19,20 is shown by way of illustration to provide an indication, it is to be understood that the output from detector 18 can be applied to any suitable indicator to provide indications of oscillation and no oscillation of the circuit 10,16, as desired, or to be held in a NO-GO indication condition by any suitable holding circuit, where desired.

OPERATION

In the operation of the device shown in the figure of drawing, let it be assumed that a quartz crystal Rc is placed in the bridge circuit 10 for test to determine whether this quartz crystal possesses less than a predetermined maximum equivalent series resistance to suit a purpose for which it is intended. The variable resistor R3 is then adjusted up and down to the point at which oscillation ceases, or in the inverse order where oscillation begins, which will determine from the calibrated value of this resistance R3 the maximum equivalent series resistance of Rc. When R3 is adjusted to produce oscillation showing that the Rc equivalent resistance is less than the resistance of R3 and the in-phase voltage at A predominates over the out-of-phase voltage at B from A—B, the circuit 10,16 will oscillate and the oscillations will be rectified in the detector circuit 18 to switch the relay switch 19,20 to the upper contact showing a GO condition for this quartz crystal Rc. In the inverse condition, if R3 is adjusted to a value equal to or less than the equivalent resistance of Rc and the out-of-phase voltage at B is greater than the in-phase voltage at A from (A—B), there will be no oscillations out of the amplifier 16 producing no output on the detector circuit 18 whereupon the switch blade 20 will rest on the lower contact showing a NO-GO condition for the quartz crystal Rc. In this manner the test circuit for the crystal Rc is continuously monitored to indicate, by the calibrated resistance R3, the equivalent resistance of Rc for the ambient temperature in which the resistance circuit 10 is placed. These indications will likewise shown the GO and NO-GO condition of the tested quartz crystal as it is run through a temperature range. In actual practice the variable resistor R3 is placed at a resistance which is tolerated for the particular use to which a crystal is to be put and the test crystal Rc is placed in the circuit and an immediate indication will be given as to GO or NO-GO for this particular crystal. In this manner quartz crystals can be readily and quickly tested for use in the desired circuit and for any temperature for its particular environment by placing the resistive bridge circuit in a like temperature zone for test throughout the temperature range.

While I have disclosed a preferred embodiment of my invention and there may be deviations from this preferred embodiment by equivalent circuitry, I desire to be limited in the spirit of my invention only by the scope of the appended claims.

I claim:

1. A test circuit for monitoring the equivalent series resistance of quartz crystals comprising:
   a high gain differential amplifier having two inputs and a single output;
   a bridge circuit having an input coupled to the output of said amplifier and two outputs coupled to said two inputs of said amplifier providing an oscillator circuit, said bridge circuit having four legs, the fourth leg for accepting a test crystal having internal series resistance and the third leg including a calibrated variable resistance, said bridge circuit providing control to said high gain amplifier to establish oscillation when said test crystal series resistance is less than the resistance preset in said calibrated variable resistance and to cause cessation of oscillation when the test crystal series resistance is greater than the resistance preset in said calibrated variable resistance;
   and indicating means coupled to the output of said high gain differential amplifier to indicate when the oscillator is oscillating and when it is not oscillating.

2. A test circuit as set forth in claim 1 wherein:
   said bridge circuit is a resistance bridge circuit including equal first and second resistances respectively in the first and second legs thereof having the junction thereof connected to a fixed potential, having the junction of the first resistance and the test crystal coupled as one of said inputs to said amplifier in phase with said amplifier output, having the junction of the second resistance and said calibrated variable resistance coupled as the other said input to said amplifier out-of-phase with said amplifier output, and having the junction of the test crystal and said calibrated variable resistance coupled to said amplifier output.

3. A test circuit as set forth in claim 2 wherein:
   said indicating means includes a detector for detecting oscillations on said output of said amplifier, said detected output being operative to actuate a signal device indicating any momentary change of series resistance above the preset variable resistance.